US009156549B2

(12) United States Patent
Vetters et al.

(10) Patent No.: US 9,156,549 B2
(45) Date of Patent: Oct. 13, 2015

(54) AIRCRAFT VERTICAL LIFT DEVICE

(75) Inventors: Daniel Kent Vetters, Indianapolis, IN (US); Andrew Barlow, Indianapolis, IN (US)

(73) Assignee: ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 671 days.

(21) Appl. No.: 12/980,420

(22) Filed: Dec. 29, 2010

(65) Prior Publication Data
US 2011/0155859 A1    Jun. 30, 2011

Related U.S. Application Data

(60) Provisional application No. 61/290,718, filed on Dec. 29, 2009.

(51) Int. Cl.
*B64C 29/00* (2006.01)

(52) U.S. Cl.
CPC .................. *B64C 29/0025* (2013.01)

(58) Field of Classification Search
CPC .. B64C 27/20; B64C 39/024; B64C 29/0064; B64C 15/02; B64C 29/0033; B64C 23/08; B64C 27/12; B64C 27/52; B64C 27/001
USPC ......... 244/17.23, 17.25, 17.27, 21, 7 C, 23 D, 244/23 A
See application file for complete search history.

(56) References Cited

U.S. PATENT DOCUMENTS

| 3,082,977 | A | * | 3/1963 | Melvin ...................... 244/17.23 |
| 3,184,183 | A | * | 5/1965 | Plasecki ...................... 244/23 R |
| 4,071,207 | A | * | 1/1978 | Piasecki et al. ............. 244/23 D |
| 4,125,232 | A | | 11/1978 | MacLean et al. |
| 4,469,294 | A | | 9/1984 | Clifton |
| 4,828,203 | A | * | 5/1989 | Clifton et al. ................ 244/12.3 |
| 4,948,072 | A | | 8/1990 | Garland et al. |
| 5,295,643 | A | | 3/1994 | Ebbert et al. |
| 5,390,877 | A | | 2/1995 | Nightingale |
| 5,454,531 | A | | 10/1995 | Melkuti |
| 5,485,958 | A | | 1/1996 | Nightingale |
| 6,170,778 | B1 | | 1/2001 | Cycon et al. |
| 6,270,038 | B1 | | 8/2001 | Cycon et al. |
| 6,318,668 | B1 | | 11/2001 | Ulanoski et al. |
| 6,382,559 | B1 | | 5/2002 | Sutterfield et al. |
| 6,464,166 | B1 | | 10/2002 | Yoeli |
| 6,561,456 | B1 | | 5/2003 | Devine |
| 6,708,920 | B2 | * | 3/2004 | Fukuyama ................... 244/12.4 |
| 6,808,140 | B2 | * | 10/2004 | Moller ......................... 244/12.5 |
| 6,817,570 | B2 | | 11/2004 | Yoeli |
| 6,896,221 | B1 | * | 5/2005 | Einarsson .................... 244/7 C |

(Continued)

OTHER PUBLICATIONS

International Search Report and Written Opinion, Dec. 1, 2011, PCT/US2010/062406.

*Primary Examiner* — Tien Dinh
*Assistant Examiner* — Assres H Woldemaryam
(74) *Attorney, Agent, or Firm* — Krieg DeVault LLP

(57) ABSTRACT

A lift device is disclosed that can be used to provide vertical lift to an aircraft or other vehicle. The lift device can include a fan that produces an airflow and a vane box that can direct the airflow. In one form the fan can be oriented at an angle relative to a reference plane in the aircraft. In another form the vane box can be oriented at an angle. The vane box can be structured to provide a maximum flow area between an aft flow vector and a forward flow vector.

9 Claims, 2 Drawing Sheets

(56) References Cited

U.S. PATENT DOCUMENTS

| | | | |
|---|---|---|---|
| 7,249,732 B2 * | 7/2007 | Sanders et al. | 244/23 A |
| 7,275,712 B2 | 10/2007 | Yoeli | |
| 7,281,680 B2 | 10/2007 | Melkuti | |
| 7,364,115 B2 | 4/2008 | Parks et al. | |
| 7,472,863 B2 * | 1/2009 | Pak | 244/12.5 |
| 8,016,226 B1 * | 9/2011 | Wood | 244/23 A |
| 8,342,441 B2 * | 1/2013 | Yoeli | 244/12.4 |
| 8,408,488 B2 * | 4/2013 | Leaver | 244/12.2 |
| 8,464,978 B2 * | 6/2013 | Yim et al. | 244/17.23 |
| 2004/0026563 A1 * | 2/2004 | Moller | 244/12.4 |
| 2006/0097105 A1 | 5/2006 | Stone et al. | |
| 2007/0034734 A1 * | 2/2007 | Yoeli | 244/12.1 |
| 2007/0095971 A1 * | 5/2007 | Yoeli | 244/12.5 |
| 2010/0301168 A1 * | 12/2010 | Raposo | 244/171.2 |
| 2011/0049306 A1 * | 3/2011 | Yoeli | 244/23 A |

* cited by examiner

AIRCRAFT VERTICAL LIFT DEVICE

CROSS REFERENCE TO RELATED APPLICATIONS

The present application claims the benefit of U.S. Provisional Patent Application No. 61/290,718, filed Dec. 29, 2009, and is incorporated herein by reference.

TECHNICAL FIELD

The present invention generally relates to aircraft airflow systems, and more particularly, but not exclusively, to aircraft vertical lift systems.

BACKGROUND

Arranging and packaging vertical lift devices remains an area of interest in the aviation community. Some existing systems have various shortcomings relative to certain applications. Accordingly, there remains a need for further contributions in this area of technology.

SUMMARY

One embodiment of the present invention is a unique aircraft vertical lift device. Other embodiments include apparatuses, systems, devices, hardware, methods, and combinations for vectoring a flow of airflow from a vertical lift device. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
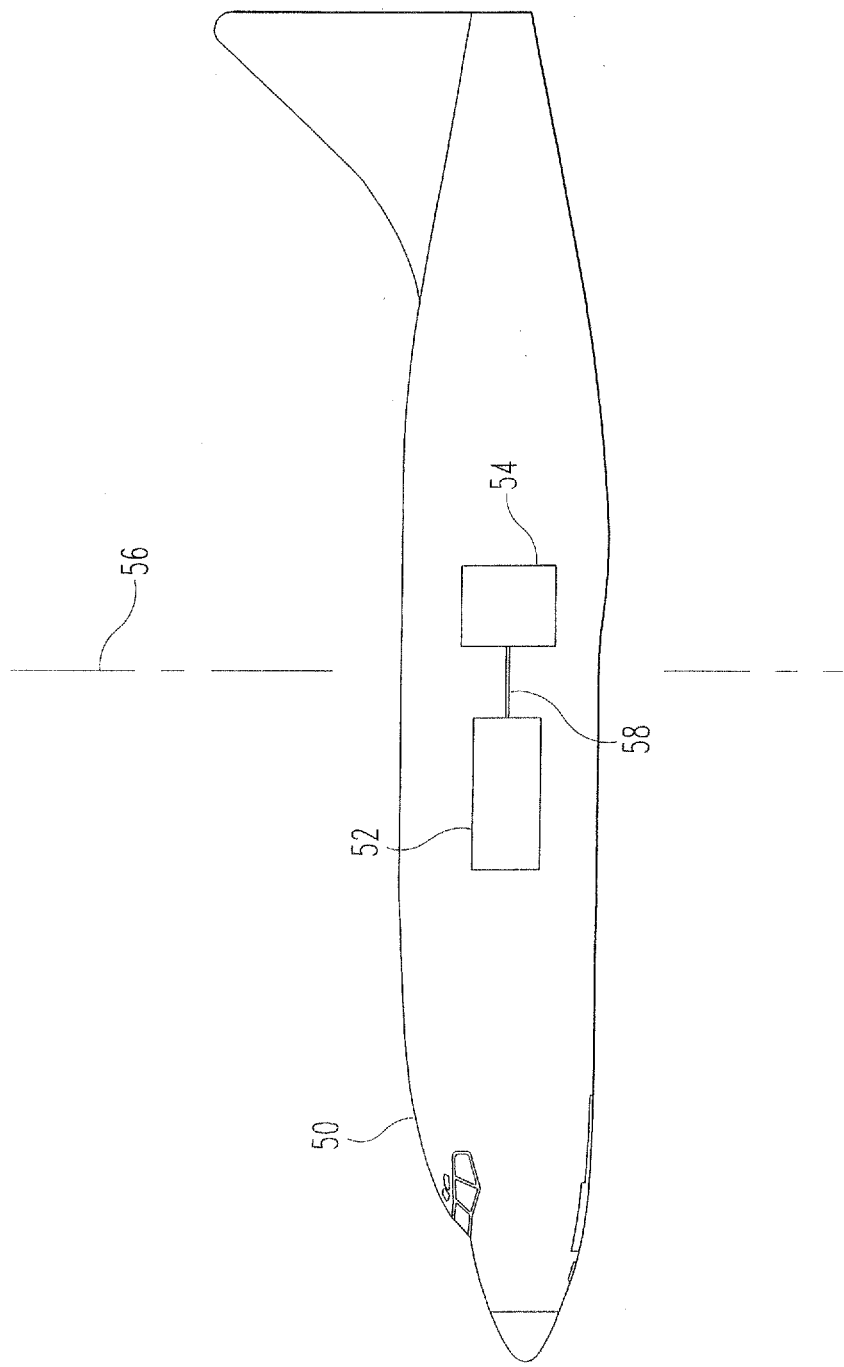
FIG. 1 shows an aircraft having a lift device.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a representation of an aircraft 50 including an engine 52 and a lift device 54 useful for providing lift to the aircraft 50. The aircraft 50 can be capable of hovering flight along a vertical axis 56 as well as forward directed hovering flight and rearward directed hovering flight. The aircraft 50 can also be capable of short takeoff and landing aircraft operations. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other vehicles. Also as used herein, the terms "forward" and "aft" generally indicate directions opposite one another and can, but need not, be used to signify a direction of the aircraft in reference to an operator point of reference. In some applications, however, the terms "forward" and "aft" can be used to signify direction along an axis reference system arbitrarily designated in the aircraft.

The engine 52 provides power to drive the lift device 54 and in some forms also provides propulsive power for the aircraft 50. The engine 52 can be a gas turbine engine in some embodiments and can take on a variety of gas turbine engine forms such as, but not limited to, turbojets, turbofans or turboprop engines. Furthermore, the engine 52 can take on other engine types such as internal combustion engines of the reciprocating piston variety, internal combustion engines of the intermittent spark ignition or compression ignition variety, and/or hybrid combinations of such engine types, to name just a few.

The lift device 54 receives power from the engine 52 that is used to drive a fan (not shown) that produces a flow capable of providing a lift force. The lift force can be suitable for sustaining the aircraft 50 in hovering flight or providing a supplemental lift force to other lift producing devices on the aircraft 50. In some forms the lift device 54 can be called a lift fan. The lift device 54 can be configured to receive power from a rotating shaft 58 driven by the engine 52, but in other forms the lift device 54 can receive power from a device such as a generator in power communication between the lift device 54 and the engine 52.

Figure 2:
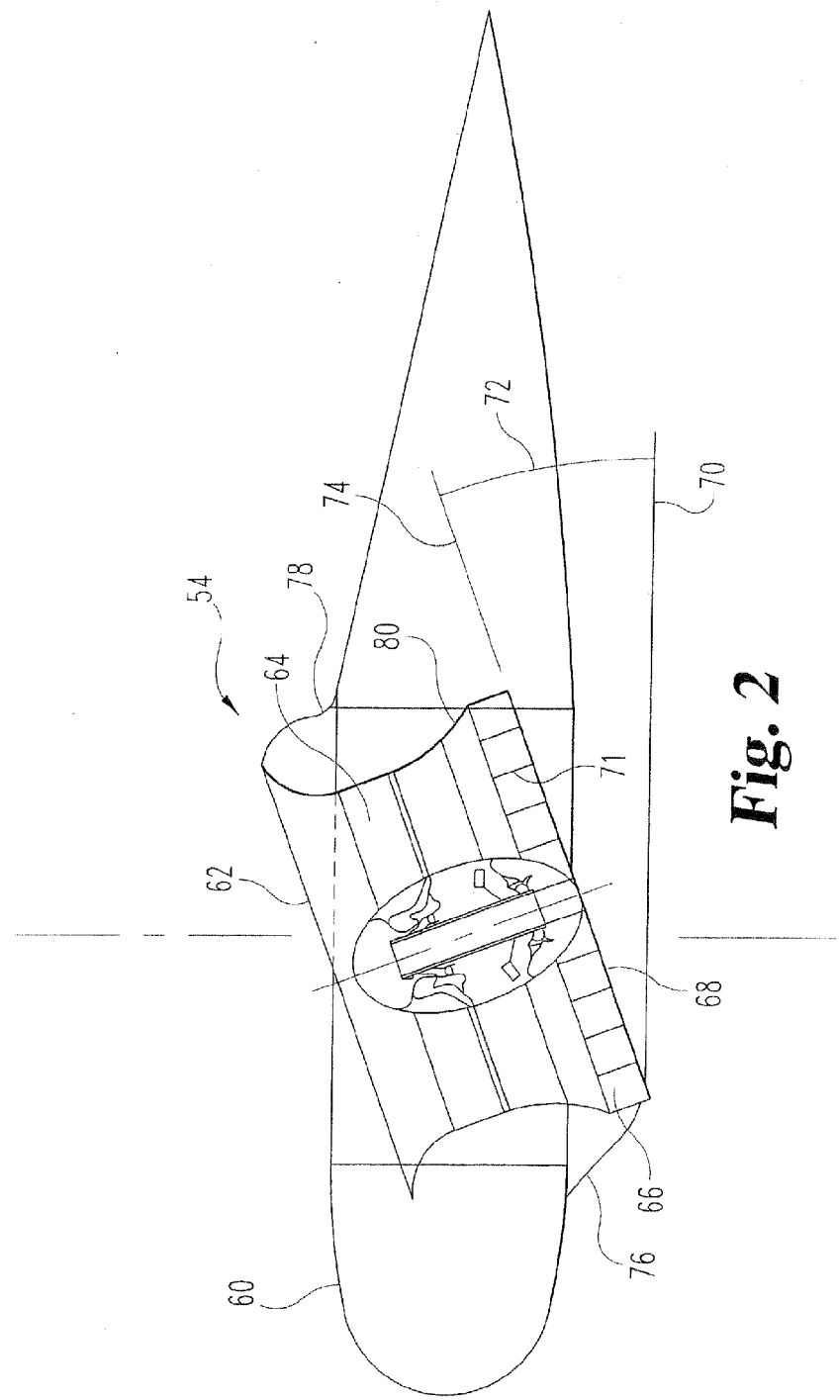
FIG. 2 depicts an embodiment of the present application.

Turning now to FIG. 2, a side view of the lift device 54 oriented relative to a structure 60 of the aircraft 50. In the illustrative form the structure 60 is an aircraft wing, but in other embodiments the structure can take on other forms. The lift device 54 in the illustrative form includes an inlet 62, flow generator 64, vane box 66, and outlet 68. The lift device can be installed at a variety of locations, such as a variety of span and chord locations relative to the wing. The lift device can be installed in a fuselage as well as in the wing. In some forms the aircraft 50 may include multiple lift devices 54 which may be identical in size, shape, configuration, etc. or may be different. The flow generator 64 can take a variety of forms such as a fan and in the illustrative embodiment includes a number of individual fan blades capable of rotating at a variety of speeds. In some embodiments one or more inlet guide vanes can be positioned upstream of the fan blades. Additionally and or alternatively, one or more outlet guide vanes can be positioned between the fan blades and the flow structures discussed below. The fan blades receive a working fluid from the inlet 62 and impart momentum to the fluid before it is discharged out of the outlet 68. In one form the working fluid is air. In some forms a portion of the working fluid accelerated by the flow generator 64 can be discharged through openings, passages, or ducts in addition or alternative to the outlet 68. It will be appreciated, therefore, that the mass flow entering the inlet 62 need not equal the mass flow exiting the outlet 68.

The vane box 66 in the illustrative form includes a number of flow structures 71 arranged such that the accelerated working fluid discharged through the outlet 68 can be turned, or vectored to a variety of angles. The flow structures 71 within the vane box 66 that turn the working fluid can take the form of vanes, to set forth just one non-limiting example, and can have airfoil shapes, among others. Additionally, the vanes can be arranged within the vane box 66 in any variety of orientations and can be actuated collectively or independent of one another. In one form the vanes extend across one dimension of the vane box similar to a "Venetian blind" arrangement. Other arrangements are also possible and are contemplated herein. It will be appreciated that the vane box 66 and/or flow structures 71 can be fixed relative to the aircraft 50 or have a fixed relationship relative to the aircraft 50. To set forth just one non-limiting example, the vanes can be fixed in spatial relationship to the aircraft 50 but otherwise free to rotate about a pivot point.

The flow area through the vane box can vary as a function of the orientation of the flow structures 71. In the embodiment in which the flow structures 71 are airfoil shaped vanes capable of being rotated about an axis along the span of the vanes, the flow area through the vanes varies as the vanes are rotated. In one form the flow area varies as a sinusoid. In one embodiment of the vane box 66 the flow area can be at a maximum when the airfoil shaped vanes are perpendicular to a reference line through the centers of rotation of multiple vanes. In this form the flow area decreases as the vanes are rotated away from this orientation. In some embodiments where the flow structures 71 are airfoil shaped vanes, the maximum forward rotation of the vanes, relative to a reference line such as the perpendicular through the centers of rotation of vanes, can be at a different angle than the maximum aft rotation of the vanes. To set forth one non-limiting example, the maximum forward rotation can be larger or smaller than the maximum aft vector. The vector angles can also be identical in some embodiments. As used herein, the forward rotation of the vanes will be understood to be a rotation of the vanes that provide for rearward flight, while the aft rotation of the vanes provides for forward flight. Such a disparity between the maximum aft rotation and the maximum forward rotation need not be present on all embodiments of the vane box 66.

The lift device 54 is angled in the illustrative embodiment relative to a reference line 70. An angle 72 can be defined between the reference line 70 and a vane box reference line 74. The reference line 70 can be a waterline of the aircraft or can represent a local horizontal, among other possibilities. In one form the vane box reference line 74 is coincident with a straight lower edge of the vane box 66. It will be appreciated, however, that the vane box 66 may not have a straight lower edge. Such a configuration of the vane box 66 does not affect the ability to define a vane box reference line 74. In some forms the vane box reference line 74 can be a line defined through the centers of rotation of a number of movable flow structures, such as, for example, the centers of rotation of airfoil shaped vanes in those particular embodiments.

The outlet 68 of the lift device 54 can be oriented such that a maximum flow area of the vane box 66 occurs when the flow structures 71 are positioned to provide a flow through the outlet an angle relative to the reference line 70. For example, in one non-limiting embodiment the flow structures 71 can be oriented at or near a right angle relative to reference line 74 to provide maximum flow area at that position. The flow exiting the outlet 68 of the lift device 54, therefore, would be at an angle relative to the reference line 70. Therefore, the maximum flow area of the vane box 66 can result in producing a flow of working fluid out of the outlet 68 which is oriented at an angle relative to the reference line 70. In the embodiment in which the flow structures 71 are provided as vanes the maximum flow area can occur when the vanes are perpendicular to the vane box reference line 74 which is oriented at an angle relative to the reference line 70. Such a relationship of the maximum flow area of the vane box 66 and the resulting relative angle formed between a flow exiting the outlet 68 and the reference line 70 can occur in any variety of arrangements and installations of the lift device 54.

One form of the lift device oriented in such a manner is illustrated in the embodiment of FIG. 2 which depicts a non-limiting form in which the flow generator 64 rotates in a plane that is parallel with the vane box reference line 74. Given this relationship, therefore, the flow generator 64 is oriented at the same angle relative to the reference line 70 as the vane box 66. In other embodiments, however, the plane of rotation of the flow generator 64 and the vane box 66 can be oriented at different angles. To set forth just one non-limiting example, the plane of rotation of the flow generator 64 can be parallel to the reference line 70 while the vane box 66 is oriented at an angle relative to the reference line 70. Such a relative orientation of the flow generator 64 and vane box 66 can include a duct segment of the lift device 54 that assists in turning the flow from the flow generator 64 to the orientation of the vane box 66. Other orientations besides those depicted above are also contemplated herein.

In one form fairings 76 and/or 78 can be used to blend the lift device 54 into the structure 60. Such fairings can be used in some applications to reduce drag and improve performance. The fairings can extend any distance along or in front of the lift device 54. In some forms the fairings 76 and/or 78 can be removable and or extendable. Alternatively and/or additionally, in some embodiments a door or other type of covering can be used to cover the inlet and/or vane box during some portions of flight, such as during conventional flight.

The lift device 54 can include a transition 80 that extends between the flow generator 64 and the vane box 66. In one embodiment the transition 80 can change shapes from its inlet to outlet. For example, the transition 80 can have a circular shape at its inlet and a quadrilateral shape at its output. A cross sectional area of the transition 80 can change from the inlet to outlet to provide a diffusion.

One aspect of the present application provides a lift fan for a vertical/short take off and landing (V/STOL) aircraft. The outlet of the lift fan is configured at an angle relative to a vertical reference line that can be perpendicular to the local horizontal. In one form the lift fan can include a fan and vane box, both of which are oriented at an angle relative to the vertical reference line. In another form, the vane box can be set at an angle different than the lift fan relative to the vertical reference line.

Another aspect of the present application is an apparatus comprising an aircraft having an engine operable to provide power, a lift fan powered by the engine and operable to provide a lift for the aircraft along a vertical axis by producing a lift fan flow stream, a vane assembly fixed relative to the aircraft and positioned downstream of the lift fan and structured to direct the lift fan flow stream in a downward direction, the vane assembly having a plurality of vanes operable to direct the fan flow stream to a vertical vector for hovering flight, a maximum aft vector for forward flight and a maximum forward vector for rearward flight, and wherein the vane box has a flow area with a maximum at a position other than the vertical vector.

A feature of the present application provides wherein the lift fan oriented at an angle relative to the vertical axis.

Another feature of the present application provides wherein the angle of the lift fan is the same as the angle of the vane assembly.

Yet another feature of the present application provides wherein the maximum aft vector is different than the maximum forward vector.

Yet still another feature of the present application provides wherein the aircraft includes an airflow fairing member operable to smooth the flow around a portion of a lift fan housing protruding beyond an airflow surface.

A further feature of the present application provides wherein the plurality of vanes includes a reference angle that is disposed at an angle relative to the vertical axis when the aircraft is in stationary hovering flight.

A still further feature of the present application provides wherein the plurality of vanes are aligned in a common plane.

Yet a still further feature of the present application provides wherein the vane assembly is disposed within a vane box oriented at an angle relative to the vertical axis, and wherein the maximum flow area of the vane box is between the vertical vector and the maximum aft vector.

Still yet a further feature of the present application further includes a diffuser disposed between the lift fan and the vane assembly.

Another aspect of the present application provides an apparatus comprising an aircraft having an engine operable to provide power, a lift fan powered by the engine and operable to provide a lift for the aircraft along a vertical axis by producing a lift fan flow stream, a vane assembly positioned downstream of the lift fan and structured to direct the lift fan flow stream in a downward direction, the vane assembly having a plurality of vanes operable to direct the fan flow stream to a vertical vector for hovering flight, a maximum aft vector for forward flight and a maximum forward vector for rearward flight, and wherein the vane box has a flow area with a maximum located between the vertical vector and the maximum aft vector.

Still another aspect of the present application provides an apparatus comprising an aircraft including a vertical lift fan having a vector member operable to alter a direction of an exit flow from a shaft driven vertical lift fan, the vector member having a variable discharge flow area and operable to vector a thrust in an aft direction, in a vertical direction, and in a forward direction, a maximum variable discharge flow area of the vector member occurring between the vertical direction and one of the forward direction and aft direction.

A feature of the present application provides wherein the lift fan is installed at an angle relative to the vertical direction and is operable to produce a flow stream at a non-vertical angle.

Another feature of the present application provides wherein the vertical lift fan is a variable pitch fan.

Yet another feature of the present application further includes inlet guide vanes disposed upstream of the vertical lift fan.

Still yet another feature of the present application provides wherein the vector member includes a plurality of vanes disposed about a reference axis oriented at an angle relative to the vertical direction.

Yet still another feature of the present application provides wherein the vector member is a vane box having a plurality of variable vanes operable to vary the variable discharge flow area.

A further feature of the present application provides wherein the vector member is oriented at an angle relative to the vertical direction, wherein the vertical lift fan is installed at an angle relative to the vertical direction, and wherein the angle of the vector member is different than the angle of the shaft driven lift fan.

A still further feature of the present application further includes a diffuser operable to receive the exit flow and deliver it to the vane assembly.

Still another aspect of the present application provides an apparatus comprising an aircraft including a vertical lift fan having a vector member operable to alter a direction of an exit flow from a shaft driven vertical lift fan, the vector member having a variable discharge flow area and operable to vector a thrust in an aft direction, in a vertical direction, and in a forward direction, a maximum variable discharge flow area of the vector member occurring between the vertical direction and the aft direction.

Still a further aspect of the present application provides an apparatus comprising an aircraft lift fan operable to produce a flow stream to provide vertical lift to an aircraft, a vane assembly in fluid communication with the aircraft lift fan having a variable flow area and operable to vector the flow stream to a vertical position to produce a hovering of the aircraft, an aft position to produce a forward movement of the aircraft, and a forward position to produce a rearward movement of the aircraft, and means for locating a maximum flow area of the lift fan at a position between the vertical position and the aft position.

Yet a further aspect of the present application provides a method comprising in the construction of an aircraft, installing a vane assembly in fluid communication with a lift fan operable to produce hovering flight for the aircraft, the vane assembly having positions operable to provide forward flight, rearward flight, and hovering flight, the hovering flight position between the forward flight position and the rearward flight position, and orienting the vane assembly at an angle relative to a reference representative of a horizontal hovering plane of the aircraft, the angle providing a maximum flow area of the vane assembly at a position located on the forward flight side of a hovering flight position.

A feature of the present application further includes integrating the lift fan with the aircraft.

Another feature of the present application provides wherein the integrating includes tilting the lift fan to an installed lift fan angle relative to the reference.

Yet another feature of the present application further includes interposing a diffuser duct between the lift fan and the vane assembly.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising: an aircraft having an engine operable to provide power; a lift fan powered by the engine and operable to provide a lift for the aircraft along a vertical axis by producing a lift fan flow stream, the lift fan having a bladed device structured to rotate about a rotational axis, the rotational axis fixed relative to the aircraft such that the rotational axis is immobile relative to an aircraft axis during the entire time of operation of the lift fan when the bladed device is rotated to produce the lift fan flow stream; a vane box fixed relative to the aircraft such that the vane box is substantially aligned with a reference point on the aircraft and is incapable of moving relative to the aircraft during the entire time of operation of the lift fan when the bladed device is rotated to produce the lift fan flow stream, the vane box positioned downstream of the lift fan and housing a vane assembly structured to direct the lift fan flow stream in a downward direction, the vane assembly having a plurality of vanes operable to direct the fan flow stream to a vertical vector for hovering flight, a maximum aft vector for forward flight and a maximum forward vector for rearward flight; and wherein the vane box has a maximum flow area when the plurality of vanes in the vane assembly are at a position other than the vertical vector, wherein the rotational axis of the lift fan is oriented at an angle relative to the vertical axis.

2. The apparatus of claim 1, wherein the angle of the lift fan is the same as the angle of the vane assembly.

3. The apparatus of claim 1, wherein the maximum aft vector is different than the maximum forward vector.

4. The apparatus of claim 1, wherein the aircraft includes an airflow fairing member operable to smooth the flow around a portion of a lift fan housing protruding beyond an airflow surface.

5. The apparatus of claim 1, wherein the plurality of vanes includes a reference angle that is disposed at an angle relative to the vertical axis when the aircraft is in stationary hovering flight.

6. The apparatus of claim 5, wherein the plurality of vanes are aligned in a common plane.

7. The apparatus of claim 1, wherein the vane box is oriented at an angle relative to the vertical axis, and wherein the maximum flow area of the vane box is between the vertical vector and the maximum aft vector.

8. The apparatus of claim 1, which further includes a diffuser disposed between the lift fan and the vane assembly.

9. An apparatus comprising: a lift fan structured to be powered by an engine and having a bladed device structured to rotate about a rotational axis, the lift fan sized so that it is operable to provide a lift for an aircraft along a vertical axis of the aircraft through production of a lift fan flow stream; a vane box fixed at an angle to the vertical axis during the entire time of rotation of the lift fan from spool up to spool down when it is producing a lift fan flow stream such that the angle is constrained from pivoting movement, the vane box positioned downstream of the lift fan and housing a vane assembly structured to direct the lift fan flow stream in a downward direction, the vane assembly having a plurality of vanes operable to direct the fan flow stream to a vertical vector for hovering flight, a maximum aft vector for forward flight and a maximum forward vector for rearward flight; and wherein the vane box has a maximum flow area when the plurality of vanes in the vane assembly are at a position other than the vertical vector, wherein the rotational axis of the lift fan is oriented at an angle relative to the vertical axis.

* * * * *